Figure 1:
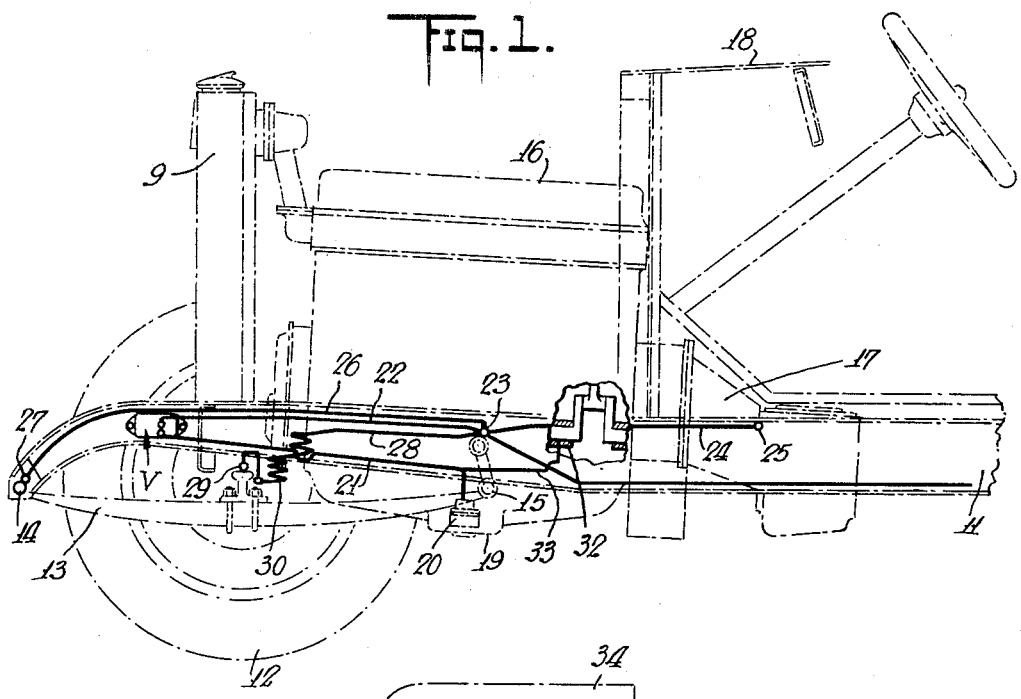

Aug. 15, 1939.  J. BIJUR  2,169,215

LUBRICATION

Filed March 28, 1931  2 Sheets-Sheet 1

INVENTOR
Joseph Bijur.
BY
Dean, Fairbank, Hirsch & Foster
his ATTORNEYS.

Aug. 15, 1939.  J. BIJUR  2,169,215

LUBRICATION

Filed March 28, 1931  2 Sheets-Sheet 2

INVENTOR
Joseph Bijur
BY
Dean, Fairbanks, Hirsch & Foster
his ATTORNEYS.

Patented Aug. 15, 1939

2,169,215

UNITED STATES PATENT OFFICE 2,169,215

LUBRICATION

Joseph Bijur, New York, N. Y., assignor to Auto Research Corporation, a corporation of Delaware Application March 28, 1931, Serial No. 525,971

15 Claims. (Cl. 184—7)

The present invention is concerned with central lubrication and has a particular field of usefulness in the oiling of all or some of the bearings of a motor vehicle.

It is among the objects of the invention to provide a simple self-contained strictly automatic lubrication installation, particularly adapted for an automotive vehicle, for feeding oil as long as the vehicle is running, to a waste or non-circulatory distribution system, as for example one supplying the chassis bearings, or simultaneously to such a waste system and a circulatory or engine lubrication system, all in accordance with the diverse requirements of the respective bearings.

It is another object to provide a system of the above type utilizing the contents of the engine oil pan as the common source of supply, and the engine oil pump as the common propulsive agency, for delivering lubricant to both the engine bearings and the chassis bearings, without modifying the engine structure and without utilizing readily cloggable restrictions or other pressure reducing devices to decrease pump pressure before application to the chassis distributing system.

Another object is to provide a system of the above type requiring substantially no adjustment whatsoever, for supplying the oil requirements of the various engine and chassis bearings, more particularly one accomplishing nearly uniform rate of feed to the chassis bearings with oil of viscosity varying widely under different weather conditions, while at the same time properly feeding the engine oiling system which remains at more nearly uniform temperature summer and winter.

Another object is to provide a simple, compact and automatically actuated mechanism for association with a chassis lubricating system having a source of relatively constant lubricant pressure, which mechanism will automatically assure lubricant pressure applications for sufficient periods of time and at such intervals winter and summer to result in substantially uniform lubrication of the bearings during both seasons.

Another object is to provide an arrangement for periodically applying engine oil pump pressure to a central chassis lubricating system which arrangement is devoid of reduction gearing or other mechanical operating or wearing connection to the running mechanism of the vehicle.

Other objects are in part obvious and in part pointed out hereinafter.

In the embodiment of the invention shown, the engine oil pump is connected in parallel to the engine lubrication system and the chassis lubrication system. The connection to the engine lubricating system is such that the engine oil pump will substantially continuously supply the engine bearings. The connection to the chassis system on the other hand is of such a character that lubricant pressure from the engine oil pump will only be periodically applied at intervals depending upon the temperature and viscosity of the lubricant, the duration of successive pressure applications being longer in winter than in summer.

A feature of the present invention resides in the provision of a control valve in the connection between the engine lubricant pump and the chassis system, automatically actuated by a power transmitting element or connection stationary relative to the vehicle throughout operation of the latter. The connection is preferably devoid of mechanism, is not subject to wearing out or to jamming and does not require lubrication. The valve will preferably be opened at intervals determined approximately by the bearing requirements and will remain open for periods determined by the viscosity of lubricant to permit lubricant to flow directly from said engine pump into the distribution system.

In one embodiment this valve is spring seated and is moved to open position, by means of a mechanism, including for example an inertia weight, which is actuated upon operation of the vehicle. In this embodiment the vibration or jiggling of the inertia weight may be converted into a rotary movement by means of a pawl and ratchet combination, driving a cam, said cam serving periodically to lift said valve from its seat. To regulate the period during which the valve is open so that engine pump pressure will be applied for a substantially longer time in winter when the chassis lines offer a higher resistance to flow because of increased lubricant viscosity than in summer, a dash pot is employed utilizing an oil preferably of the same viscosity characteristics as the chassis lubricant. The dash pot is placed on the chassis frame in such a position, preferably in association with the valve structure, that it will be subject to atmosphere temperature at all times.

Figure 2:
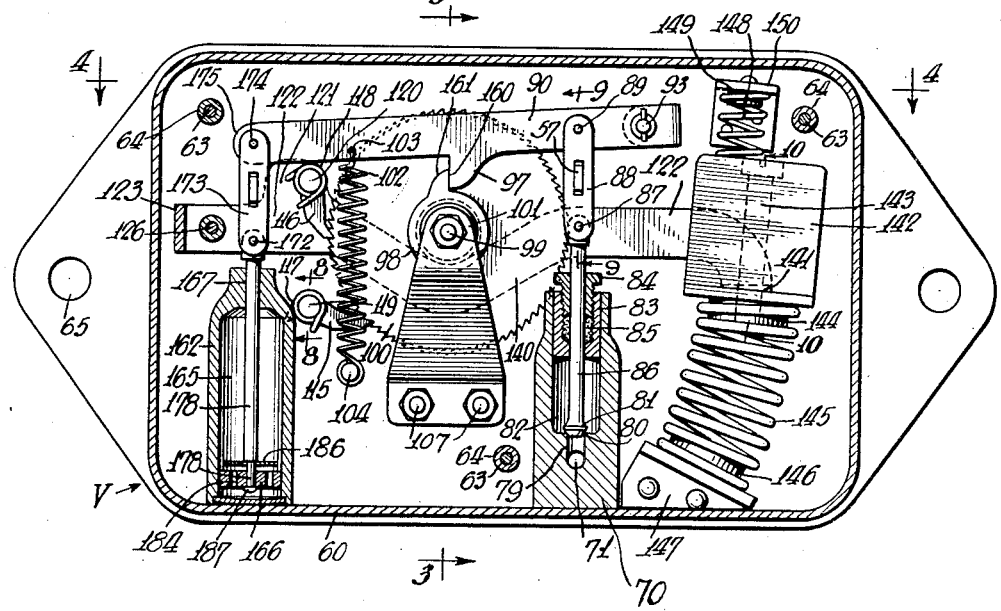
Figure 4:
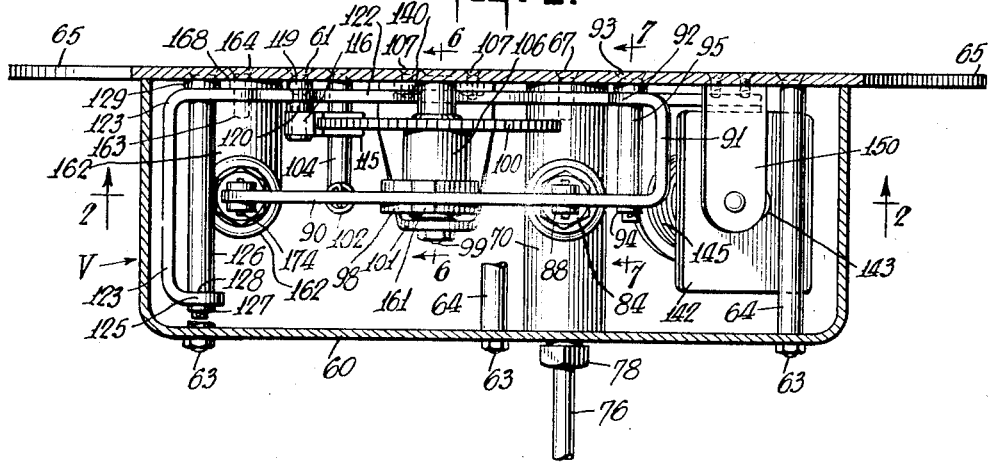
Figure 5:
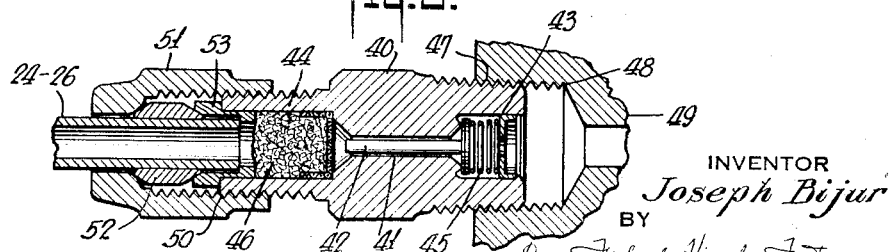

In the accompanying drawings, in which are shown one or more of the several features of one embodiment of the invention:

Fig. 1 is a side view of the front part of an automobile with the hood and adjacent wheel removed, illustrating the application of the lubricating installation of the present application;

Figs. 2, 3 and 4 are longitudinal side and transverse sectional views of the valve and its actuated mechanism upon the lines 2—2 of Fig. 4, and 3—3 and 4—4 of Fig. 2;

Fig. 5 is a longitudinal sectional view of a typical flow metering instrumentality which may be utilized;

Figs. 6, 7, 8, 9 and 10 are longitudinal sectional views of details of the valve mechanism on an enlarged scale taken on the lines 6—6 and 7—7 of Fig. 4, and 8—8, 9—9 and 10—10 of Fig. 2, respectively.

In Fig. 1 the automobile chassis 11 is supported on the wheels 12 by means of springs 13, the ends of which are respectively hinged and shackled as indicated at 14 and 15 to said chassis. Upon the chassis 11 is supported the radiator 9 and the engine 16 with its cooperating clutch housing 17 and the body partially shown at 18. The lower part of the engine 16 is provided with an oil pan 19 containing the engine lubricating pump 20, which in addition to supplying the engine bearings, one of which is diagrammatically illustrated at 32 with its conduit 33, also connects with the chassis system by a conduit 21 leading to the valve structure V secured in the U-shaped side member 34 of the chassis frame, preferably in front of the radiator 9 (see also Fig. 3). From the valve V the line 22 leads to the combined junction and flow metering device or drip plug 23 supplying the spring shackle 15. This junction connects with the line 24 supplying the clutch housing 17 by means of the flow metering device or drip plug 25, the line 26 with the flow metering device or drip plug 27 supplying the front hinge and the conduit 28 leading to the front axle 29 by means of the helical bridge coil 30.

A typical form of flow metering device or drip plug is shown in Fig. 5. In this embodiment the body 40 has a central bore 41 substantially filled by pin 42 forming an annular restriction passage therewith, the length and diametral clearance determining the rating of the drip plug. The body is also provided with outlet and inlet sockets 43 and 44 respectively, the former containing the spring seated check valve 45 and the latter containing the protective strainer plug 46. The outlet end of the drip plug is provided with a pipe thread 47 for insertion in the tapped socket 48 in the bearing structure 49 and the inlet end of the drip plug is provided with a straight thread 50 for attachment of the thimble 51, the compression sleeve 52 being clamped between said thimble 51 and the sleeve 53 inserted in the inlet socket 44 to grip the pipe end. The drip plug as shown is adapted to be utilized at the end of the line as shown at 25 and 27 (see Fig. 1), but with the provision of a junction head instead of the pipe coupling thimble 51 it may be employed in the run of a line as at 23.

The valve structure (see Figs. 2, 3 and 4) is enclosed in a casing 60 which is attached to the backing plate 61 by the three bolts 63, partly enclosed by the spacing sleeves 64, said backing plate 61 being provided with holed ears 65 enabling attachment of the valve casing structure V to the inner side of the chassis frame 34 within the channel thereof. Secured to the backing plate 61 by the screws 67 and resting on the bottom of the casing 60 by means of the foot 68 is the valve body 70 provided with the superimposed horizontal inlet and outlet passageways 71 and 72 respectively, the outer portions of which are enlarged and tapped as indicated at 73 and 74 to receive the inlet and outlet pipe ends 75 and 76 and the coupling nuts 77 and 78 respectively. The tapped sockets 73 and 74 register with, and the coupling nuts 77 and 78 pass through, corresponding openings in the casing 60. The body 70 is also provided with a vertical bore 79 communicating with the inlet passageway 71, the upper end of which bore 79 is formed into a valve seat 80 for cooperation with the valve 81. When the valve 81 is lifted from its seat 80, the bore 79 communicates with the chamber 82 into the upper portion of which is press fitted a bored and tapped plug 83 which receives the bushing 84 compressing the packing 85 against the valve rod 86 passing therethrough.

The clevis member 88 (see also Fig. 9) consisting of the parallel strips 55 held together by the spacer piece 56, reduced portions 57 of which piece project through openings in said strips 55 and are riveted thereto, connects the upper end of the rod 86 to the L-shaped lever 90 by the pivot pins 87 and 89 respectively. The short arm 91 of the lever 90 is bent back at 92 so that said strip or lever 90 will have a double bearing upon the rod 93 (see also Fig. 7), the shoulders 94 and 95 and the washer 96 retaining the lever 90 in correct position thereupon. The long arm of the lever 90 is provided with a dependent cam follower portion 97 to cooperate with the cam 98 riveted to the sleeve 106 upon the shaft 99 (see also Fig. 6). The cam 98 lifts the valve 81 through the lever 90 from its seat 80 against the force of the spring 102, the ends of which spring are attached to the lever at 103 and to the post 104.

The cam 98 and the ratchet wheel 100 (see also Fig. 6) are riveted to a sleeve 106 which bears upon a shaft 99. This is supported at one end by the backing plate 61, and at the other end by the bracket 101, which is attached to the backing plate 61 by the screws 107. Cooperating with the ratchet wheel 100 is the detent pawl 115 and the actuating pawl 116, which are respectively provided with springs 117 and 118 to retain them in engagement with the teeth of said wheel. The stud 119 (see also Fig. 8) forms a bearing for the pawl 115 and is fixed in the backing plate 61. The stud 120 similarly forming a bearing for the pawl 116 is fixed in an upstanding ear 121 on the long arm 122 of the L-shaped lever 123. The short arm 125 of the lever 123 is bent back to form two bearings upon the rod 126 which is provided with the positioning shoulders 128 and 129 and the washer 127, and is of substantially the same construction as shown in Fig. 7. The long arm 122 is depressed at 140, where it passes under the shaft 99.

The end of the long arm 122 of the lever 123 is provided with a flange 141 which is attached to the inertia or jiggle weight 142 by means of the bolt 143, said bolt also attaching to said weight the upper spring retainer 144 (see also Fig. 10). The resilient spring 145 is curved along the arc of the movement of the weight 142, the lower portion of the spring 145 being guided by the projection 146 on the plate 147 riveted to the backing plate 61. The upward movement of the weight is resiliently stopped by means of the stiff coil spring 148 the upper end of which is retained by the circular projection 149 on the L-shaped plate 150 also riveted to backing plate 61.

In operation, motion of the vehicle will cause a vibration of the chassis frame 11 and in turn a jiggling or reciprocation of the weight 142 alternately stressing and unstressing the spring 145, the amplitude or frequency of which jiggling or reciprocation will depend upon the character of the road and the speed of the vehicle. The lever 123 will vibrate with the weight 142 and the pawl 116 pivoted thereto will gradually rotate the ratchet 100 and the cam 98 in a counterclockwise direction. The cam 98 will periodically raise the valve 81 from its seat 89 upon contact with follower surface 97, the interval between successive valve openings depending upon the amplitude and frequency of the vibration of the inertia weight 142. The opening of the valve will result in an application of engine pump pressure from the passage 71 to the passage 72 and in turn to the chassis lubricating system.

To regulate the period for which the valve remains unseated after being opened by the cam 98 a dash pot may be provided. The dash pot consists of a casting or body 162 provided with a rearwardly extending horizontal foot 168 attached to the backing plate 61 by the screw 164; with the dash pot chamber 165 containing the ported piston 166 loosely fitted upon the rod 178 between the stop 187 and the valve plate 186; and with a bore 167 in the upper part thereof guiding the piston rod 178. The piston chamber 165 is filled with chassis lubricant or with another liquid of substantially the same viscosity characteristics, the piston 166 fits therewithin with small clearance to prevent too rapid closing of the valve 81 by the stressed spring 102 when the follower 97 passes beyond the lobe 161. The clevis member 173 of substantially the same construction as shown in Fig. 9 affords a pivotal connection by means of the pins 172 and 174 between upper end of the piston rod 178 and end 175 of the L-shaped lever 90. As shown the dashpot will retard closing of the valve but not opening thereof, since the passages 184 therethrough will be uncovered by the valve plate 186 during upward movement of the plunger 166 and opening of the valve 81, permitting lubricant to flow substantially without retardation from above to below the piston. The piston during this movement is pressed against the stop 187 on the dashpot rod 178. During reverse movement of the piston 166 and closing of the valve 186, the piston 166 will closely contact with the valve plate 186, resulting in a closing of the ports 184, and rendering the dashpot effective to retard such movement.

Since the valve structure V including the dashpot D is exposed to atmospheric temperature and is filled by a liquid or an oil of the same viscosity characteristics as the chassis lubricant, the dashpot D will effect about the same order of retardation of the valve closure as the drip plug outlets offer to the flow of lubricant to the bearings.

In summer when the lubricant is relatively liquid, the dashpot D will cause but little retardation in the closing of the valve 81 with the result that such closing will be substantially instantaneous when the lobe 161 passes the shoulder 160 of the follower 97. In winter in view of the increased lubricant viscosity in the chassis lines and increased resistance therein to lubricant flow, the engine oil pump may be connected to the chassis distributing system for a much longer period, or in severe conditions substantially continuously, without resulting in over-lubrication of the chassis bearings. The dashpot D will automatically effect this desirable condition by retarding the valve closure, the retardation being substantially proportional to the lubricant viscosity and therefore sufficient to ensure the chassis bearings receiving their proper supply of lubricant, regardless of weather conditions.

The dashpot D may also be made integral with the valve body 70 and receive its supply of oil therefrom. As shown, the dashpot is caused to act only during valve closing movement, since retardation of the closing alone is desired, but if desired it may also be caused to act in both directions. The entire valve casing V might also be made liquid-tight and permitted to fill entirely with lubricant to assure thorough lubrication of the moving valve parts, in which case satisfactory allowance would have to be made because of damping of the weight by the lubricant.

The inertia valve mechanism of the present invention could also be utilized to regulate the flow of lubricant or other fluid from one reservoir to another reservoir or to a distributing system by gravity. By replacing the valve rod 86 with a pump piston or unpacked plunger and adding inlet and/or outlet valves or by utilizing the dashpot itself as a lubricant pressure source, suitable pumping, accumulating or metering mechanisms might also be provided, which could be conveniently positioned outside of the vehicle hood. Instead of causing opening of the valve, the inertia weight and/or cam could be arranged so as to effect periodic valve closing. The valve mechanism might also be placed at different positions upon the vehicle.

It is to be understood that any suitable arrangements, including filters, strainers or sedimentation tanks, might be utilized in the connections from the engine oil pump to the chassis distributing line before or after the valve structure to cleanse that portion of the engine oil admitted to the chassis system.

Other rigid or non-wearing power transmitting connections between the vehicle and the valve mechanism, such as disclosed in my Patent No. 1,746,139 may also be utilized.

The spring 102 is desirably sufficiently strong to seat the valve 81 against engine oil pressure under all conditions, but if desired it might be weakened so as to crack open at high engine lubricant pressures as may be encountered at high speeds.

The expression "a connection stationary relative to the mechanism throughout operation thereof serving as a transmission member" as used in the specification and claims means that the operating connection for the flow regulating valve or flow regulating reciprocating member is a stationary immovable part devoid of mechanism, not subject to wearing out or jamming, which does not itself require lubrication and which finally has the advantage of permitting disposition of the lubricant supply control mechanism wherever convenient on the engine or vehicle part.

By the expression "waste or non-circulatory lubricating system", is meant a system in which the lubricant is not collected and returned to the reservoir after usage at the bearing as is characteristic of chassis lubricating systems, in contrast to the engine lubricating systems of automotive vehicles which are of the circulatory type.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

The claims are as follows:

1. A central lubricating installation for a plurality of bearings of a mechanism comprising a branched distribution conduit system leading to said bearings, a source of lubricant pressure, means for periodically admitting said lubricant pressure to said system during operation of the mechanism and temperature controlled means for regulating the duration of the admission periods including a dashpot arrangement.

2. A central lubricating installation for a plurality of bearings of a mechanism comprising a branched distribution conduit system leading to said bearings, a source of lubricant pressure and means including a spring supported inertia weight and a valve controlled by said inertia weight for periodically admitting said lubricant pressure to said system during operation of the mechanism, said means including a retarding device controlled in accordance with the lubricant viscosity, said retarding device controlling the period during which lubricant pressure is admitted to said system.

3. In a lubricant distributing installation for an automotive vehicle including a continuous lubricant pressure source and a place of distribution, a valve arrangement between said source and said place of distribution comprising a reciprocating valve and a mechanism for opening and closing said valve including a lever, a cam for moving said lever to open said valve and temperature controlled means to retard reverse movement of said lever to close said valve.

4. In a lubricant distributing installation for an automotive vehicle including a continuous lubricant pressure source and a place of distribution, a valve arrangement between said source and said place of distribution comprising a reciprocating valve which in the open and closed positions respectively establishes and cuts off communication between the source and the place of distribution and a mechanism for opening and closing said valve including a lever and a viscosity controlled means associated with said lever for retarding closing movement of the valve.

5. In combination with an automotive vehicle provided with an engine having an engine lubricating system and an oil pump continuously supplying lubricant in relatively large quantities to said engine lubricating system and also provided with a chassis; a central chassis lubricating installation comprising a branched distribution system provided with flow metering outlets leading to the bearings, a connection from the outlet of the engine oil pump to the system, means for causing periodic opening and closing of said connection and temperature responsive means associated with and controlling said first mentioned means and positioned in such location on the vehicle that it will be subject to substantially the same temperature as the flow metering outlets.

6. A central chassis lubricating installation for an automotive vehicle provided with a hood enclosing the engine structure, the temperature of which is substantially more constant than atmospheric and a chassis carrying the bearings supplied with lubricant, the temperature of which is substantially atmospheric, said installation comprising a lubricant reservoir and pump under said hood and maintained at engine temperature, a distributing conduit system leading to said chassis bearings and supported upon said chassis structure and an automatic temperature-controlled mechanism positioned outside of the hood and similarly supported upon said chassis structure whereby it is maintained at atmospheric temperature for regulating the flow of lubricant from the reservoir to the chassis system, said mechanism including a valve in the line of flow from the reservoir to the chassis system, means to periodically open said valve, means to close said valve after each opening and temperature-responsive means to retard action of said last mentioned means.

7. In combination with an automotive vehicle of the type including an engine, a circulatory engine lubricating installation for supplying the main engine bearings, an engine oil pump connected to the inlet of said engine lubricating installation, and a series of other bearings requiring substantially less lubricant than the engine bearings; a non-circulatory lubricant installation for said other bearings comprising a distributing system, flow metering drip plug devices associated with the outlets of said distributing system, a connection from the engine oil pump to the inlet of said system, a spring seated valve in said connection, said spring normally being of such strength as to keep said valve closed against engine oil pump pressure, and means automatically operated upon actuation of the vehicle to lift said valve periodically and provided with a temperature control mechanism to retard closing of said valve by said spring, whereby the period during which said valve is held open is determined.

8. In combination with an automotive vehicle provided with an engine having an engine lubricating system and an oil pump continuously supplying lubricant in relatively large quantities to said engine lubricating system and also provided with a chassis; a central chassis lubricating installation comprising a branched distribution system provided with flow metering outlets leading to the bearings, a connection from the outlet of the engine oil pump to the system, means for causing periodic opening and closing of said connection and temperature responsive means for controlling said first mentioned means to determine the period during which said connection is maintained open and said means positioned in such location on the vehicle that it will be subject to substantially the same temperature as the flow metering outlets, said temperature responsive means being positioned upon the chassis frame in front of the engine.

9. In combination with an automotive vehicle provided with an engine having an engine lubricating system and an oil pump and also provided with a chassis; a central chassis lubricating installation comprising a branched distribution system provided with flow metering outlets leading to the bearings, a connection from the outlet of the engine oil pump to the system, means for causing periodic opening and closing of said connection and temperature responsive means for controlling said first mentioned means to determine the period during which said connection is maintained open and said means positioned in such location on the vehicle that it will be subject to substantially the same temperature as the flow metering outlets, said first mentioned means being automatically actuated by the operation of the vehicle.

10. In combination with an automotive vehicle provided with an engine having an engine lubricating system and an oil pump continuously supplying lubricant in relatively large quantities to said engine lubricating system and also provided with a chassis; a central chassis lubricating installation comprising a branched distribution system provided with flow metering outlets leading to the bearings, a connection from the outlet of the engine oil pump to the system, means for causing periodic opening and closing of said connection and temperature responsive means for controlling said first mentioned means to determine the period during which said connection is maintained open and said means positioned in such location on the vehicle that it will be subject to substantially the same temperature as the flow metering outlets, said first mentioned means including an inertia weight operated valve.

11. In combination with an automotive vehicle provided with an engine having an engine lubricating system and an oil pump and also provided with a chassis; a central chassis lubricating installation comprising a branched distribution system provided with flow metering outlets leading the bearings, a connection from the outlet of the engine oil pump to the system, means for causing periodic opening and closing of said connection and temperature responsive means associated with and controlling said first mentioned means and positioned in such location on the vehicle that it will be subject to substantially the same temperature as the flow metering outlets, said temperature responsive means including a dashpot controlled device for retarding closing of said connection.

12. In combination with an automotive vehicle provided with an engine having an engine lubricating system and an oil pump and also provided with a chassis; a central chassis lubricating installation comprising a branched distribution system provided with flow metering outlets leading to the bearings, a connection from the outlet of the engine oil pump to the system, means for causing periodic opening and closing of said connection and temperature responsive means for controlling said first mentioned means to determine the period during which said connection is maintained open and said means positioned in such location on the vehicle that it will be subject to substantially the same temperature as the flow metering outlets, said temperature responsive means including a dashpot and said first mentioned means including a valve, said dashpot being filled with a liquid of substantially the same viscosity characteristics as the chassis lubricant.

13. A central chassis lubricating installation for an automotive vehicle provided with a hood enclosing the engine structure, the temperature of which is substantially more constant than atmospheric and a chassis carrying the bearings supplied with lubricant, the temperature of which is substantially atmospheric, said installation comprising a lubricant reservoir and pump under said hood and maintained at engine temperature, a distributnig conduit system leading to said chassis bearings and supported upon said chassis structure and an automatic temperature-controlled mechanism positioned outside of the hood and similarly supported upon said chassis structure whereby it is maintained at atmospheric temperature, said mechanism being provided with means for regulating the flow of lubricant from the reservoir to the chassis system, said control mechanism including an inertia-operated reciprocating member, a valve in the line of flow from the reservoir to the chassis system, means actuated by said inertia operated member to periodically open said valve, means to close said valve after each opening and temperature-responsive means to retard the action of said last mentioned means.

14. In a motor vehicle of the type having an engine with a plurality of spaced bearings, a chassis with a plurality of spaced bearings, said chassis being driven and moved over a road by said engine, said engine bearings requiring relatively large amounts of lubricant during movement of the engine and said chassis bearings requiring relatively small amounts of lubricant during road movement of the chassis, said chassis being provided with axles carrying wheels, a chassis frame and springs supporting said frame on said axles, whereby said frame will be caused to undergo a periodic vertical vibration or oscillation during road movement of the chassis; the combination therewith of a lubricating installation for said bearings including a central reservoir casing enclosing the spaced bearings of said engine to receive any overflow from said engine bearings, a gear pump directly driven from said engine supplied with lubricant from said reservoir, a distributing conduit system leading from said gear pump to said bearings, said conduit system having unrestricted communication with the engine bearings and being provided with drip plug outlets to the chassis bearings and flow regulating means upon the conduit system in the line of flow leading to the chassis bearings, said flow regulating means being actuated by said periodic vertical vibration and oscillation of said chassis frame to cut off lubricant flow from said gear pump to said chassis bearings and to permit only an intermittent flow at intervals from said gear pump to said system toward said chassis bearings.

15. In a motor vehicle of the type having an engine with a plurality of spaced bearings, a chassis with a plurality of spaced bearings, said chassis being driven and moved over a road by said engine, said engine bearings requiring relatively large amounts of lubricant during movement of the engine and said chassis bearings requiring relatively small amounts of lubricant during road movement of the chassis, said chassis being provided with axles carrying wheels, a chassis frame and springs supporting said frame on said axles, whereby said frame will be caused to undergo a periodic vertical vibration or oscillation during road movement of the chassis; the combination therewith of a lubricating installation for said bearings including a central reservoir casing enclosing the spaced bearings of said engine to receive any overflow from said engine bearings, a gear pump directly driven from said engine supplied with lubricant from said reservoir, a distributing conduit system leading from said gear pump to said bearings, said conduit system having unrestricted communication with the engine bearings and being provided with drip plug outlets to the chassis bearings and flow regulating means upon the conduit system in the course of flow leading to the chassis bearings, said flow regulating means being actuated by said periodic vertical vibration and oscillation of said chassis frame to cut off lubricant flow from said gear pump to said chassis bearings and to permit only an intermittent flow at intervals from said gear pump to said system toward said chassis bearings, said last mentioned means including a spring supported inertia weight, a ratchet and a pawl engaging said ratchet, said pawl being actuated by said inertia weight, a cam actuated by said ratchet and a spring closed valve periodically opened by said cam.

JOSEPH BIJUR.